United States Patent
Stausberg et al.

(10) Patent No.: US 8,673,141 B2
(45) Date of Patent: Mar. 18, 2014

(54) OIL FILTER DEVICE

(75) Inventors: Wolfgang Stausberg, Morsbach (DE);
Markus Beer, Morsbach (DE)

(73) Assignee: IBS Filtran Kunststoff/Metallerzeugnisse GmbH, Morsbach (DE)

(*) Notice: Subject to any disclaimer, the term of this patent is extended or adjusted under 35 U.S.C. 154(b) by 321 days.

(21) Appl. No.: 12/403,618

(22) Filed: Mar. 13, 2009

(65) Prior Publication Data
US 2009/0230049 A1     Sep. 17, 2009

(30) Foreign Application Priority Data
Mar. 14, 2008 (DE) .......................... 10 2008 014 416

(51) Int. Cl.
| | |
|---|---|
| *B01D 29/33* | (2006.01) |
| *B01D 29/56* | (2006.01) |
| *B01D 35/02* | (2006.01) |
| *B01D 29/66* | (2006.01) |
| *B01D 35/00* | (2006.01) |

(52) U.S. Cl.
CPC ............... *B01D 29/33* (2013.01); *B01D 29/66* (2013.01); *B01D 35/005* (2013.01); *B01D 35/02* (2013.01); *B01D 2201/31* (2013.01)
USPC ........ 210/172.4; 210/316; 210/337; 210/342; 210/346; 210/461

(58) Field of Classification Search
USPC ............. 210/167.02, 167.04, 167.05, 167.08, 210/172.3, 172.4, 315, 316, 335, 337, 342, 210/346, 416.4, 416.5, 448, 461, 489, 338, 210/485, 488
See application file for complete search history.

(56) References Cited

U.S. PATENT DOCUMENTS

| | | | | | |
|---|---|---|---|---|---|
| 3,282,428 | A | * | 11/1966 | Rosaen | 210/172.4 |
| 3,419,151 | A | * | 12/1968 | Smith et al. | 210/489 |
| 4,133,769 | A | * | 1/1979 | Morgan, Jr. | 210/455 |
| 4,402,827 | A | * | 9/1983 | Joseph | 210/167.08 |
| 4,783,271 | A | * | 11/1988 | Silverwater | 210/167.04 |
| 4,853,123 | A | * | 8/1989 | Hayes et al. | 210/335 |
| 4,966,697 | A | * | 10/1990 | Rosaen | 210/342 |
| 5,494,575 | A | | 2/1996 | Kitajima et al. | |
| 5,702,237 | A | | 12/1997 | Hill | |
| 5,888,383 | A | * | 3/1999 | Cox | 210/167.04 |

(Continued)

FOREIGN PATENT DOCUMENTS

| | | |
|---|---|---|
| CN | 1919411 A | 2/2007 |
| DE | 3123269 C2 | 6/1982 |
| DE | 10240666 A1 | 3/2004 |
| EP | 1733775 A1 | 12/2006 |
| EP | 1825897 A2 | 8/2007 |

(Continued)

*Primary Examiner* — Christopher Upton
(74) *Attorney, Agent, or Firm* — Loza & Loza, LLP; Leo J. Jennings

(57) ABSTRACT

The present invention provides a suction oil filter device for an engine or a transmission that has an oil inlet and an oil outlet on the filter housing, a suction oil pump connectable to the oil outlet, using which a partial vacuum may be generated between oil inlet and oil outlet, a fine filter medium and an ultrafine filter medium, which are situated between the oil inlet and the oil outlet. The fine filter medium is attached to the oil inlet or to the oil outlet, and the ultrafine filter medium is situated before the fine filter medium in the flow direction and in a secondary flow area of the filter housing. A high filtration performance may thus be achieved at low production outlay.

12 Claims, 9 Drawing Sheets

(56) References Cited

U.S. PATENT DOCUMENTS

| | | | |
|---|---|---|---|
| 6,165,373 A | 12/2000 | Agner | |
| 6,539,912 B1 | 4/2003 | Beer | |
| 6,638,423 B2 * | 10/2003 | Dockery | 210/172.3 |
| 6,793,812 B2 * | 9/2004 | Caldwell et al. | 210/167.08 |
| 7,087,160 B2 * | 8/2006 | Beer et al. | 210/167.02 |
| 2003/0024768 A1 | 2/2003 | Jones | |
| 2004/0007520 A1 | 1/2004 | Rosendahl et al. | |
| 2004/0164008 A1 * | 8/2004 | Smith | 210/342 |
| 2007/0151906 A1 * | 7/2007 | Beer et al. | 210/130 |
| 2008/0290013 A1 * | 11/2008 | Stausberg et al. | 210/335 |
| 2009/0230049 A1 | 9/2009 | Stausberg et al. | |

FOREIGN PATENT DOCUMENTS

| | | |
|---|---|---|
| EP | 1994974 A2 | 11/2008 |
| FR | 1407307 | 7/1965 |
| JP | 54025943 A | 2/1979 |
| JP | H02-59352 U | 4/1990 |
| JP | 03-052608 | 3/1991 |
| JP | 04-171209 | 6/1992 |
| JP | 09-327609 | 12/1997 |
| JP | 2005516149 A | 6/2005 |
| JP | 2006336657 A | 12/2006 |
| JP | 2006346674 A | 12/2006 |
| WO | 0246584 A1 | 6/2002 |

* cited by examiner

OIL FILTER DEVICE

CROSS REFERENCE TO RELATED APPLICATIONS

This application claims priority to DE 102008014416.9, filed on Mar. 14, 2008, the disclosure of which is incorporated herein by reference in its entirety.

BACKGROUND OF THE INVENTION

The invention relates to a suction oil filter device for filtering oil in engines and transmissions, an oil pan having such an oil filter device, and a filter system having a pressure oil device and such a suction oil filter device.

A suction oil filter device may be used for filtering oil in engines and transmissions. A pump is situated on the oil outlet of the filter device, the pump suctioning the oil to be filtered through a filter medium using partial vacuum. It is typical to situate a suction oil filter device directly in an oil sump of an oil pan, all of the oil to be filtered flowing through this suction oil filter device. Such a design requires only a small amount of additional installation space, is thus space-saving, and does not require any additional connection lines. The associated filter housing of a suction oil filter device typically has an upper shell and a lower shell, a filter medium being clamped between the two shells. However, narrow tolerances are to be maintained, so that high requirements are placed on the manufacturing technology. Because a minimum oil volume flow must additionally pass through the suction oil filter at high viscosity of the oil and/or at low temperature of the oil to achieve sufficient lubrication of an engine or a transmission, only a relatively low filtration performance may be achieved using the filter medium.

To achieve higher oil purity, in addition to the suction oil filter device, a pressure oil filter device may also be provided. In a pressure oil filter device, oil to be filtered is pressed into a filter device using a pump. Such a device is usually situated in a secondary flow and may be switched in using a valve, for example. Because only a part, usually less than 50% of the oil volume flow to be filtered flows through a pressure oil filter device of this type, a highly efficient filter medium, in pleated form, for example, may be used. However, a relatively high dirt impingement is connected with the high filter performance, so that a filter medium of a pressure oil filter device must be replaced relatively frequently. The higher filtration performance of the system made of suction oil filter device and pressure oil filter device may therefore often mean a higher maintenance effort in comparison to a suction oil filter device alone.

SUMMARY OF THE INVENTION

It is an object of the invention to provide a suction oil filter device, an oil pan having such a suction oil filter device, and a filter system having a pressure oil filter device and such a suction oil filter device, the suction oil filter device being more simply producible and requiring a lower maintenance effort when working together with a pressure oil filter device, a higher filtration performance nonetheless being achieved.

This object is achieved by the subjects of the independent claims. Advantageous refinements of the invention are the subject matter of the subclaims.

This suction oil filter device according to the invention for an engine or a transmission has an oil inlet and an oil outlet on a filter housing, a suction oil pump being connectable to the oil outlet, using which a partial vacuum may be generated between oil inlet and oil outlet, the suction oil filter device additionally having a fine filter medium and an ultrafine filter medium, which are situated between the oil inlet and the oil outlet. The suction oil filter device according to the invention is constructed in such a manner that the fine filter medium is attached either to the oil inlet or to the oil outlet. If the fine filter medium is attached to the oil inlet, this is an inside-outside filter device. If the fine filter medium is attached to the oil outlet, an outside-inside filter device is provided. According to the invention, the ultrafine filter medium is situated in the flow direction before the fine filter medium and in a secondary flow area of the filter housing in both filter device types.

It is to be noted that in a filter device having an inside-outside flow scheme, which is referred to hereafter in short as inside-outside filter device, fluid to be filtered flows directly from the filter housing inlet into a filter pocket and then through a filter pocket layer in the direction toward the filter housing outlet. Any residues thus remain in the interior of the filter pocket and the filtered oil may flow out through the filter housing outlet. A reversed flow scheme is provided in an outside-inside filter device. The fluid to be filtered first flows through the filter housing inlet into the filter housing and then further through a filter medium from the outside to the inside into the filter pocket. In the filter pocket, the filtered fluid flows to the filter housing outlet. In this configuration, the residues present in the fluid thus remain outside the filter pocket in the filter housing. In a filter device in which the inside-outside flow scheme is provided, the filter pocket is situated in such a manner that the filter pocket opening is oriented essentially covering the inlet opening of the filter housing. It is thus ensured that all of the fluid to be filtered first flows into the filter pocket and may not reach the filter housing outlet unfiltered. Correspondingly, vice versa, in a filter device in which the outside-inside flow scheme is provided, the filter pocket opening is lined up with the filter housing outlet opening. The two flow scheme types are directly reversible and correspond to one another.

In the production of the suction oil filter device according to the invention, the fine filter medium is preferably not clamped between an upper shell and a lower shell of the filter housing, so that narrow tolerances have to be taken into consideration. Rather, in such an embodiment, an inside-outside filter device is attached to the oil inlet of the filter housing, so that when the housing is manufactured, the upper shell and lower shell only still have to be joined to one another. The flow behavior of oil upon entry into the filter housing of an inside-outside filter device having the suction oil filter device according to the invention differs from that of a filter device in which the fine filter medium is situated essentially horizontally between the housing shells. In a suction oil filter device according to the invention, with an inside-outside filter device in the area of the oil inlet or with an outside-inside filter device in the area of the oil outlet, only a relatively small proportion of the oil penetrates the fine filter medium. This proportion of the oil forms a so-called secondary flow. An additional ultrafine filter medium is attached in this area in the suction oil filter device according to the invention, which has a higher filtration performance than the fine filter medium. The oil thus first passes an ultrafine filter medium and subsequently a fine filter medium in the secondary flow area. From the aspect of a cascaded filtration, the sequence of the filter media must actually be selected in reverse, i.e., first passage through a fine filter medium and then passage through an ultrafine filter medium. However, such a solution has the disadvantage that complex support is required for the relatively labile ultrafine filter medium. The invention begins here, in that the sequence of the filter media is switched only for the secondary flow area, which a relatively small oil volume passes through. The fine filter medium is used as a support for the ultrafine filter medium positioned upstream in the flow direction, so that no additional retainers are required for the ultrafine filter medium.

At high viscosity and/or low temperatures of the oil, the ultrafine filter medium is hardly penetrated by the oil. With decreasing viscosity and/or increasing temperature of the oil, however, the ultrafine filter medium also has flow through it in the secondary area of the filter housing, so that the suction oil filter device achieves a higher filtration performance overall, a lower manufacturing outlay nonetheless being necessary. A special advantage of the suction oil filter device according to the invention is that oil which has already been better filtered passes through an additionally used pressure oil filter device, which typically has a relatively small overall size and a correspondingly small filter medium, so that if the suction oil filter device according to the present invention is used, the service life of the pressure oil filter device is increased. The maintenance effort for a filter system made of pressure oil filter device and suction oil filter device according to the invention is thus lower than previously.

According to one embodiment of the invention, the ultrafine filter medium and the fine filter medium are directly connected to one another. Even with a very turbulent flow, the relatively labile ultrafine filter medium may thus be situated securely, without a support or similar measures being necessary. The ultrafine filter medium and the fine filter medium are preferably connected to one another over their entire areas. This represents a very secure embodiment. However, it may already suffice if the ultrafine filter medium is only connected to the fine filter medium at multiple points, for example, at two ends and/or edges. An especially low manufacturing outlay is achieved in an embodiment in which the ultrafine filter medium is only directly connected to the fine filter medium at one end. This connection is preferably proximal to the oil inlet in an inside-outside filter device or proximal to the oil outlet in an outside-inside filter device. Oil penetrating into the filter housing thus presses the ultrafine filter medium against the fine filter medium, so that it is no longer necessary to fasten the ultrafine filter medium at the opposite free end. The reliable positioning of the ultrafine filter medium is basically assumed by the inflowing oil. The combination filter medium made of ultrafine filter medium and fine filter medium is thus very easily producible, in that a layer of the ultrafine filter medium is attached to the fine filter medium only in the area of the oil inlet in an inside-outside filter device or only in the area of the oil outlet in an outside-inside filter device. Further fastening of the two filter media in the interior of the filter pocket which is formed by the fine filter medium is no longer necessary.

The ultrafine filter medium is thus fastened to the fine filter medium, the fine filter medium being fastened to the filter housing. The fastening may be performed in a metal housing by crimping, for example, and in a plastic housing by welding, for example. In an inside-outside filter device, the ultrafine filter medium is attached inside the filter pocket, while in contrast in an outside-inside filter device, the ultrafine filter medium is attached outside the filter pocket.

According to a further embodiment, the suction oil filter device according to the invention may be implemented in such a manner that the ultrafine filter medium has an increasing distance to the fine filter medium beginning from the oil inlet, the maximum distance being a multiple of the thickness of the fine filter medium. This increasing distance allows the oil to flow around the ultrafine filter medium on the bottom side, so that more area of the fine filter medium may be penetrated. The spacing may preferably be achieved by a least one spacer. This ensures that a free end of the very mobile ultrafine filter medium is not pressed against the fine filter medium by the oil flow.

In the suction oil filter device according to the invention, it has been shown that a good filtration performance is achieved if the fine filter medium separates particles having a size which is greater than 50 µm and the ultrafine filter medium separates particles having a size which is greater than 20 µm.

The object is also achieved by an oil filter system which has a pressure oil filter device and a suction oil filter device as described above. Especially efficient filtration may be achieved if the pressure oil filter has an ultrafine filter medium having the same filtration performance as the ultrafine filter medium in the suction oil filter.

BRIEF DESCRIPTION OF THE DRAWINGS

The invention is described further hereafter on the basis of exemplary embodiments illustrated in the drawings.

DETAILED DESCRIPTION

Figure 1:
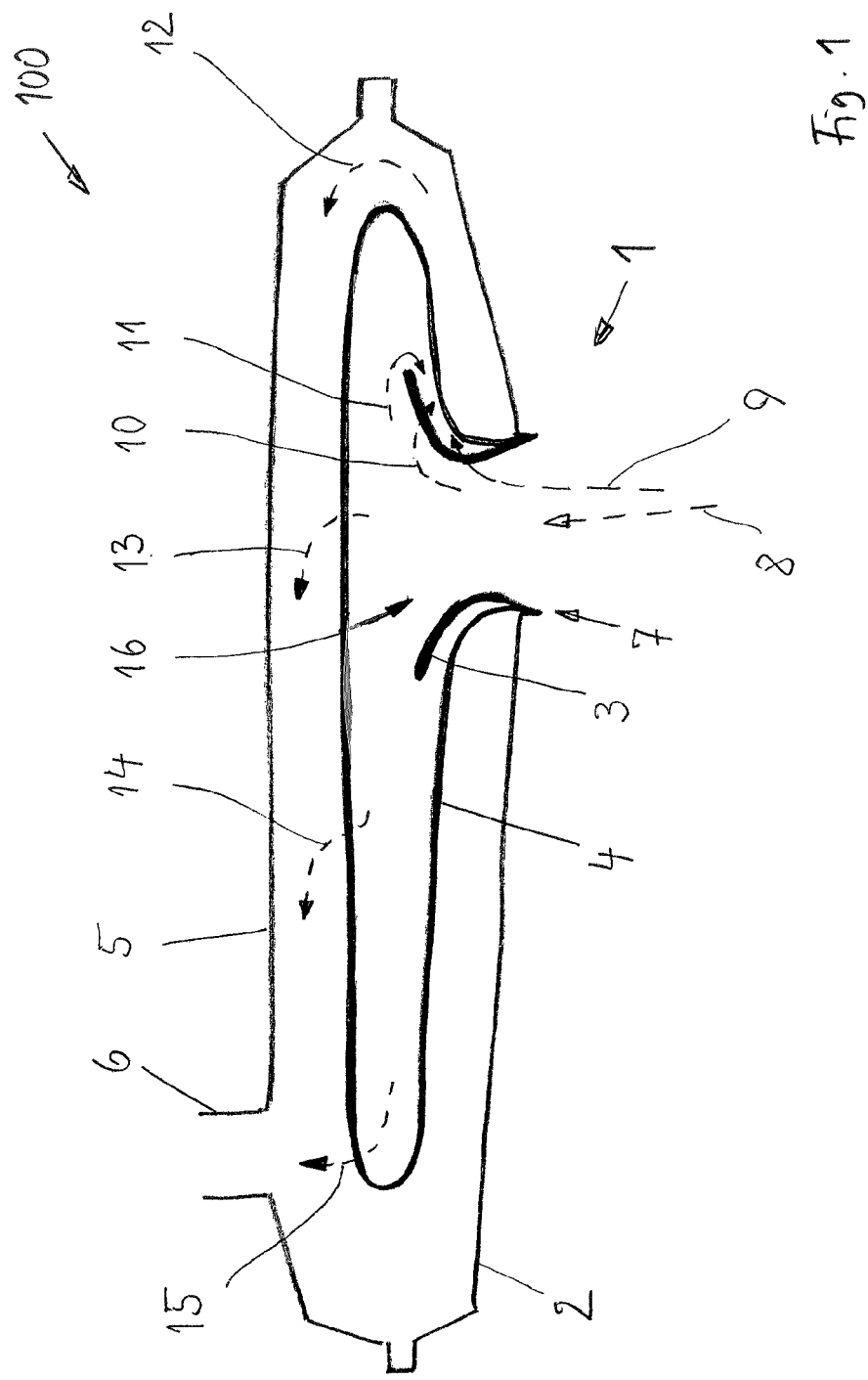
FIG. 1 shows a schematic illustration of a first embodiment of the suction oil filter device according to the invention.

The invention will now be described with reference to the drawing figures, in which like reference numerals refer to like parts throughout.

FIG. 1 shows a longitudinal cross-section of an embodiment of the oil filter device 100 according to the invention according to the inside-outside flow scheme. The device has an oil inlet 1 and an oil outlet 6, a suction pump being able to be attached to the latter. The oil inlet 1 is provided on one side in a filter lower shell 2, the oil outlet 6 being situated on an opposite side at the greatest possible distance from the oil outlet 1 in a filter upper shell 5. The filter lower shell 2 and the filter upper shell 5 together form a filter housing. Oil to be filtered passes through the oil inlet 1 into the filter device inner chamber 16 because of a partial vacuum generated by the suction oil pump.

Figure 2:
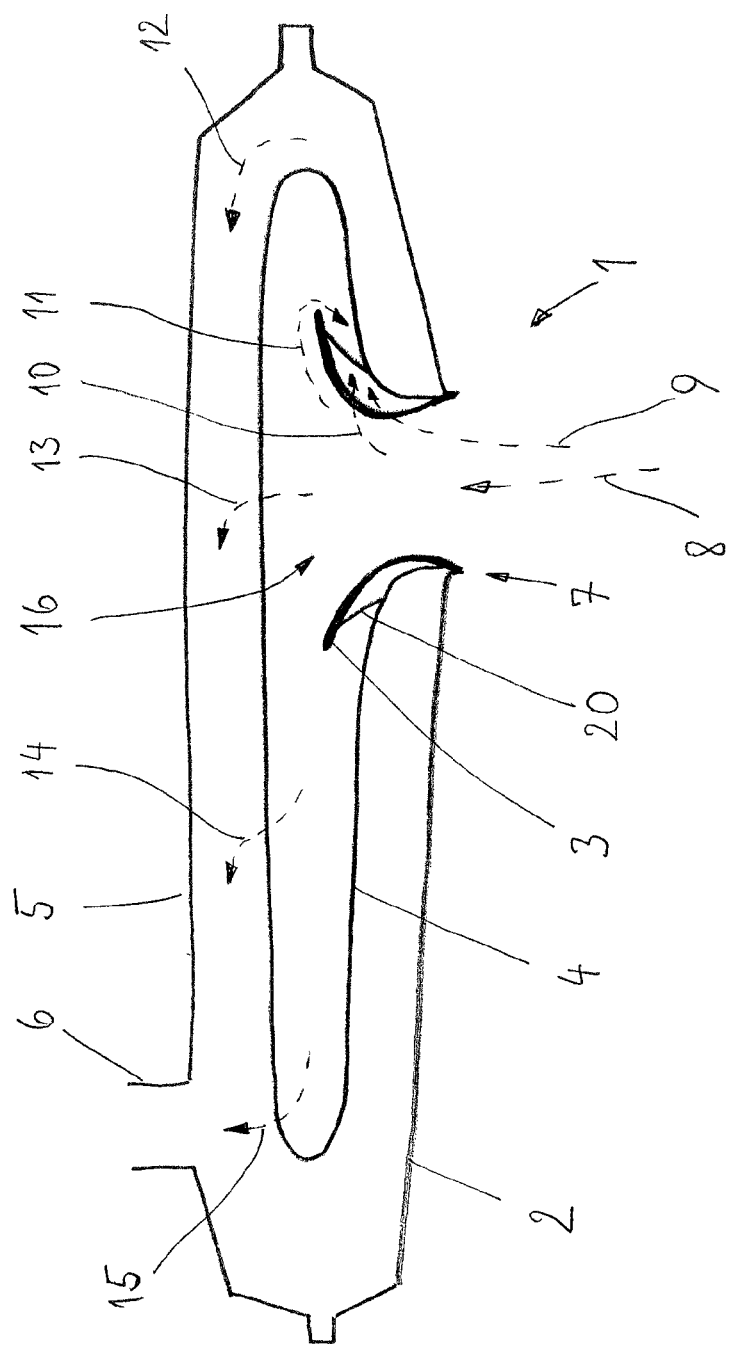
FIG. 2 shows a schematic illustration of a second embodiment of the suction oil filter device according to the invention.

The fine filter medium 4 is implemented as a filter pocket, the pocket opening being attached in the area of the oil inlet 1, see reference numeral 7. The ultrafine filter medium 3 is attached at one end and/or one edge to this fine filter medium 4. In the embodiment shown in FIG. 1, the ultrafine filter medium is spaced apart from the fine filter medium, the ultrafine filter medium having an increasing distance from the fine filter medium 4 beginning from the oil inlet. The maximum distance is a multiple of the thickness of the fine filter medium 4. The oil flow 8 thus penetrates into the filter housing at the oil inlet 1 and is divided into a main flow and secondary flow. The main flow penetrates the fine filter medium 4, see arrows 13 through 15, while the secondary flow is incident on the ultrafine filter medium 3, see arrows 9 and 10. The oil passing through the ultrafine filter medium 3 subsequently penetrates the fine filter medium 4 situated behind it and, after flowing around the filter pocket out of the fine filter medium 4, reaches the outlet 6, see arrow 12. Oil may also flow around the ultrafine filter medium 3 and arrive behind the ultrafine filter medium 3 due to the distance of the ultrafine filter medium 3 from the fine filter medium 4, see arrow 11. The area of the fine filter medium 4 through which oil not yet filtered by the ultrafine filter medium 3 may pass is thus enlarged. The spacing between ultrafine filter medium 3 and fine filter medium 4 may be achieved in that the fine filter medium 3 reaches this position itself because of the implemented flow. If this is insufficient, the ultrafine filter medium 3 may be provided with reinforcement fibers or kept at a distance by a least one spacer 20, see FIG. 2.

Figure 3:
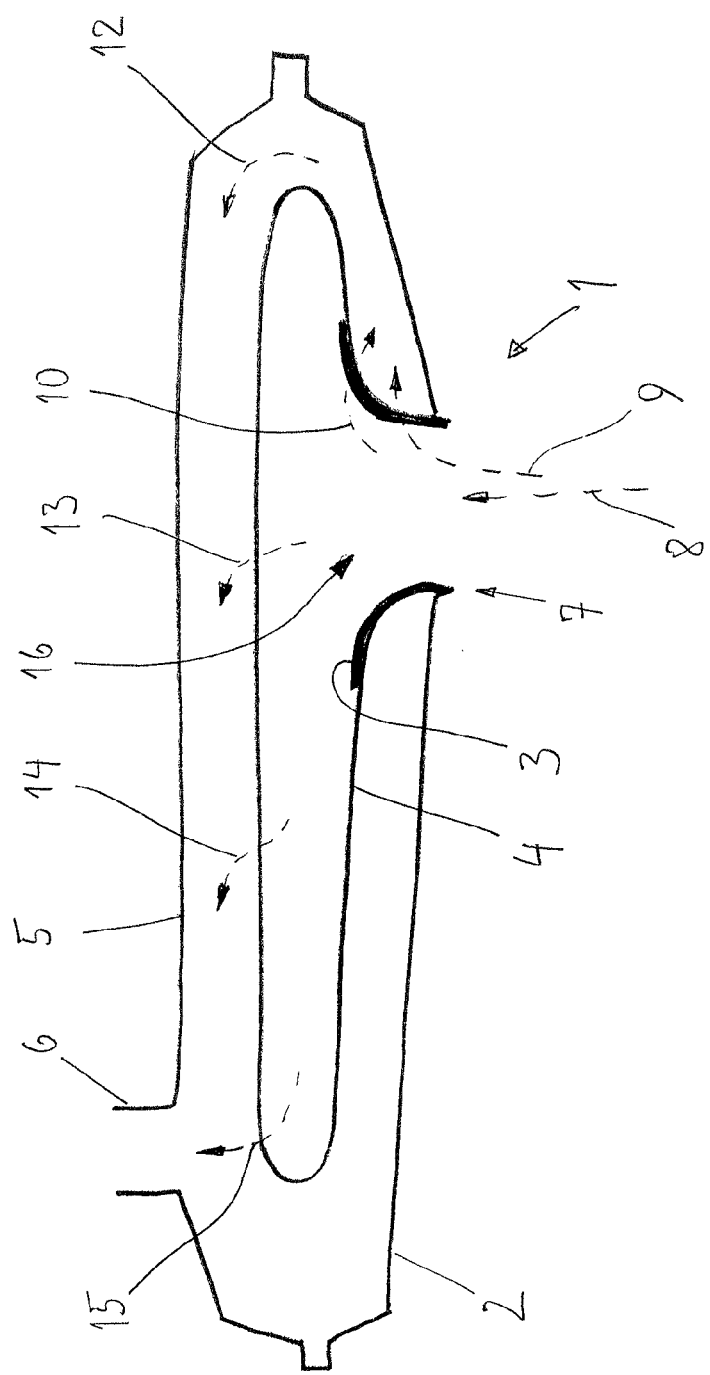
FIG. 3 shows a schematic illustration of a third embodiment of the suction oil filter device according to the invention.

The simplest embodiment to manufacture is shown in FIG. 3. The ultrafine filter medium 3 presses against the fine filter medium 4 over its entire area in this embodiment. The proportion of the oil which penetrates the ultrafine filter medium 3 is higher the lower the viscosity and/or the higher the temperature of the oil. The ultrafine filter medium 3 may have such a low torsion resistance that it is pressed against the fine filter medium by the penetrating oil volume flow 8 and is in contact over its entire area there.

If an ultrafine filter medium 3 is used, the differential pressure in the suction oil filter device increases in comparison to a suction oil filter device in which only a fine filter medium 4 is provided. This pressure increase may be reduced if spacing is provided between the two filter media, for example, by spacers 20, see FIG. 2.

Figure 4:
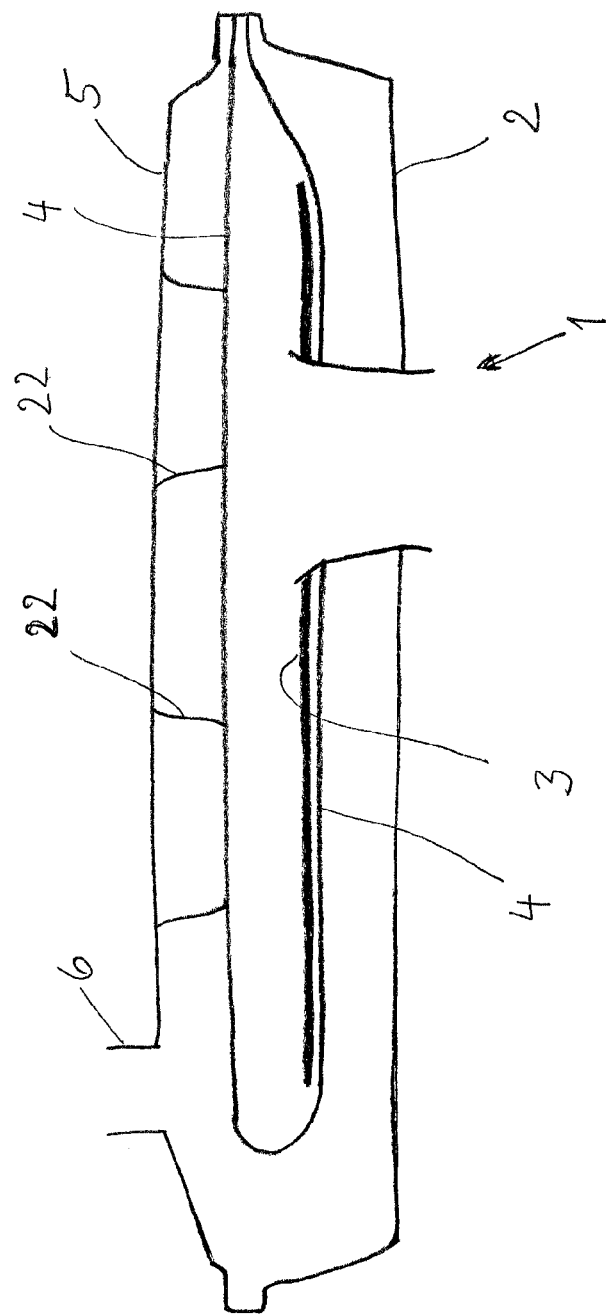
FIG. 4 shows a schematic illustration of a fourth embodiment of the suction oil filter device according to the invention.

A further embodiment of an inside-outside filter device is shown in FIG. 4. In contrast to the embodiments shown in FIGS. 1 through 3, the fine filter medium 4 is clamped between the lower shell 2 and upper shell 5 of the filter housing on one side. The ultrafine filter medium 3 is not only situated in the intake area of the filter housing, but rather extends out into the edge area of the filter pocket 21 formed by the fine filter medium 4. However, it is thus still located in a secondary flow area. In the embodiment shown in FIG. 4, the fine filter medium 4 may additionally be supported in its position by spacers 22.

Figure 5:
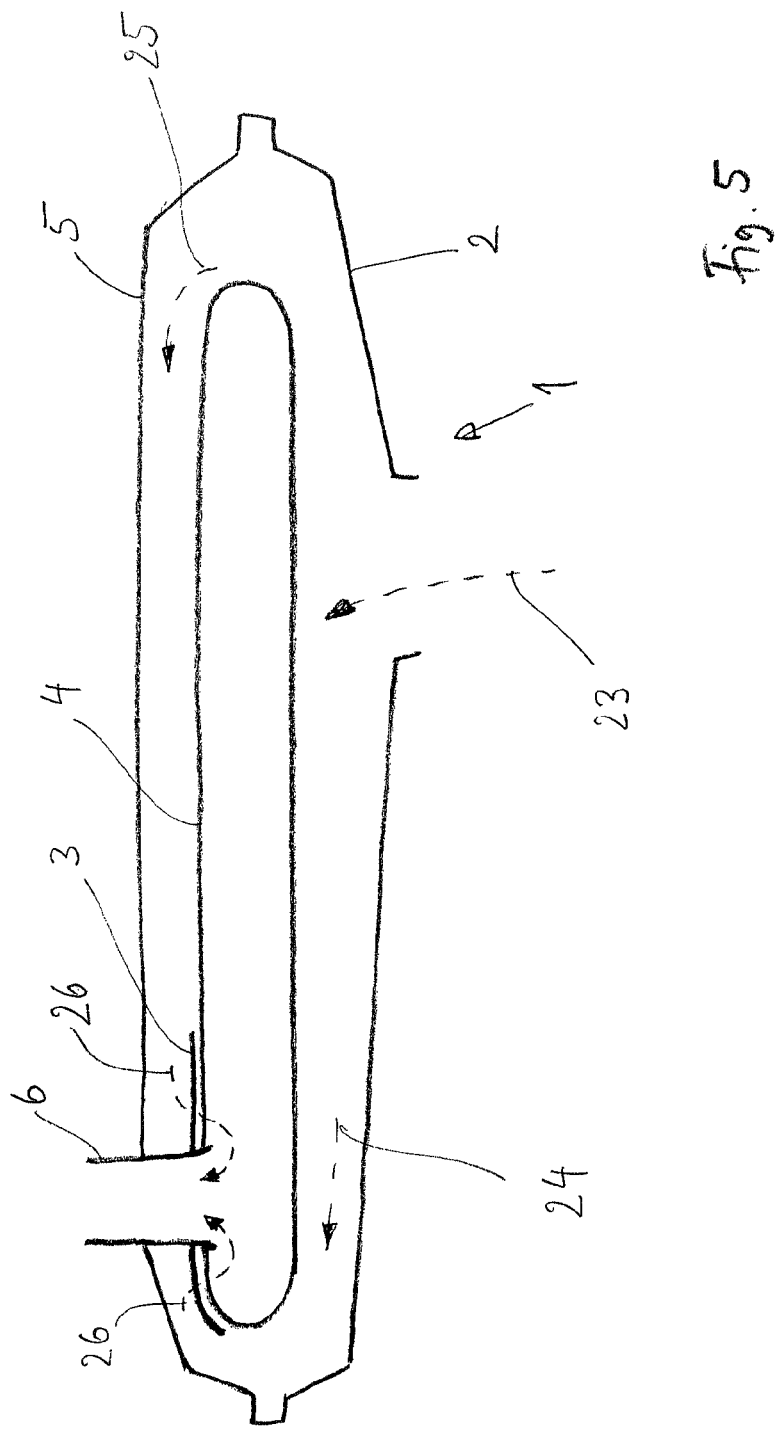
FIG. 5 shows a schematic illustration of a fifth embodiment of the suction oil filter device according to the invention.
Figure 6:
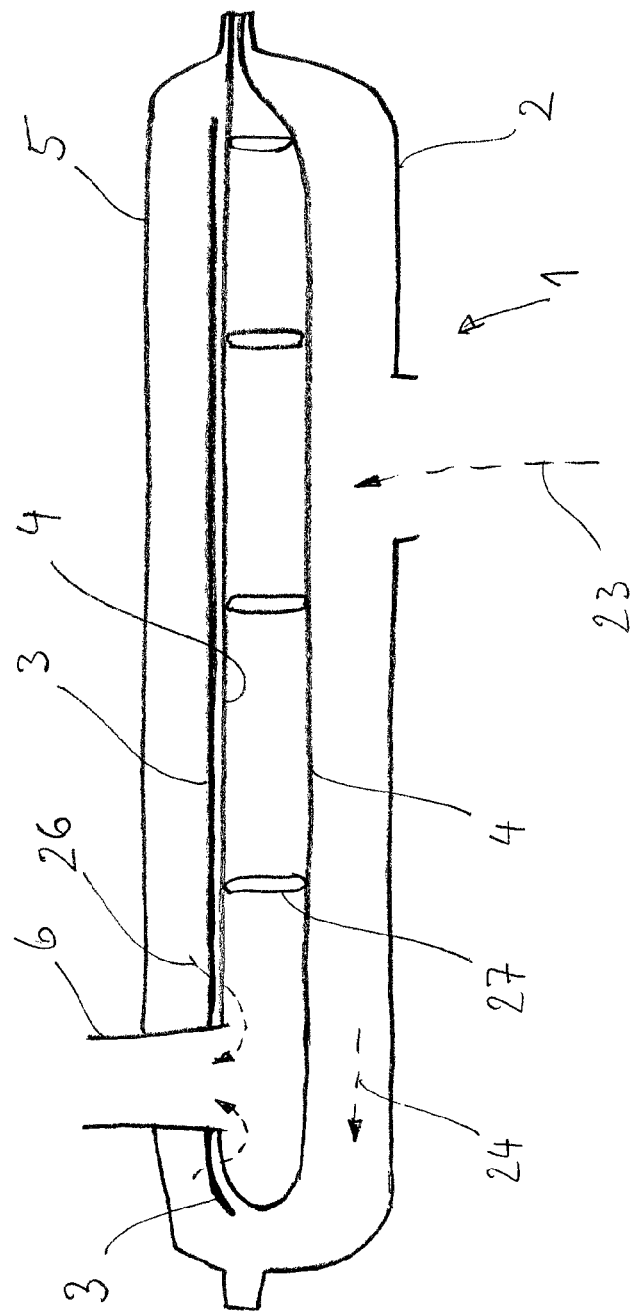
FIG. 6 shows a schematic illustration of a sixth embodiment of the suction oil filter device according to the invention.

A filter device having an outside-inside flow scheme is shown in FIGS. 5 and 6. The fluid to be filtered flows through the oil inlet 1 into the filter housing and either penetrates directly to the fine filter medium 4 into the filter pocket, see flow arrow 23, or flows externally along the filter pocket, see flow arrows 24 or 25. The fluid penetrates in the area of the outlet 6 through the ultrafine filter medium 3 and subsequently through the fine filter medium 4 into the filter pocket and reaches the outlet 6 from there, see arrows 26.

In the embodiment shown in FIG. 6, similarly to the embodiment shown in FIG. 4, the ultrafine filter medium 3 is not only positioned in the area of the outlet, but rather extends up into the edge area of the filter pocket. In addition, the fine filter medium 4 is clamped between lower shell 2 and upper shell 5 and is held at a predetermined distance to one another using spacers 27.

Figure 7:
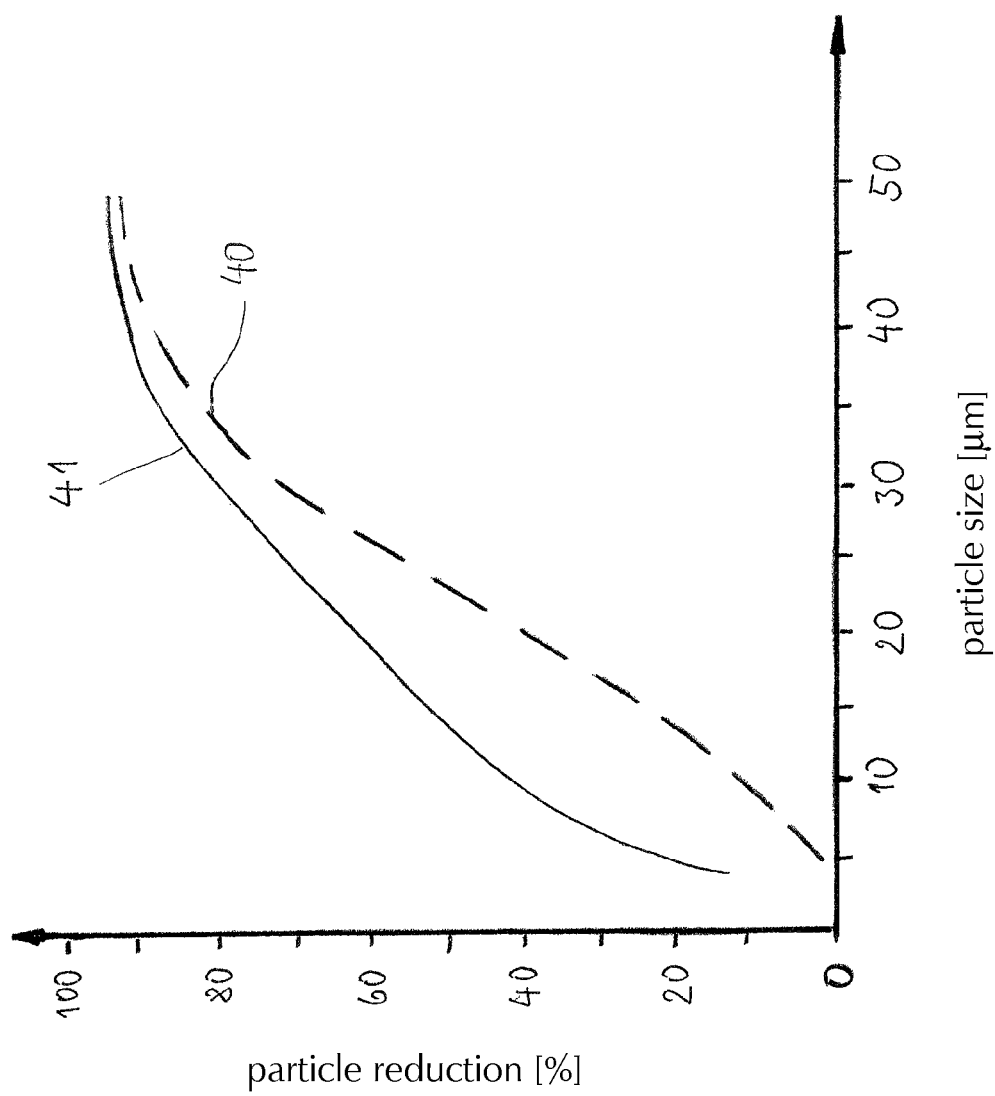
FIG. 7 shows a diagram in regard to the filtration efficiency as a function of the particle size in the third embodiment of the suction oil filter device according to the invention.

FIG. 7 shows a diagram in which the filtration efficiency of a suction oil filter device, which only has one fine filter medium, see dashed curve 40, and a suction oil filter device, which has a fine filter medium and an ultrafine filter medium according to the invention, see solid curve 41, are shown. The particle reduction after a fluid circulation lasting 60 minutes is plotted in percent on the ordinate. The particle size in micrometers is plotted on the abscissa. A comparison of the curves 40 and 41 shows that in the suction oil filter device according to the invention having a fine filter medium and an ultrafine filter medium, a significantly higher particle reduction is achieved. For example, particles of the size 20 μm are approximately 62% filtered out by the suction oil filter device according to the invention after 60 minutes oil circulation time. In a suction oil filter device which is only provided with a fine filter medium, only approximately 40% of the particles having a size of 20 μm may be filtered out in the same time, see curve 40.

Figure 8:
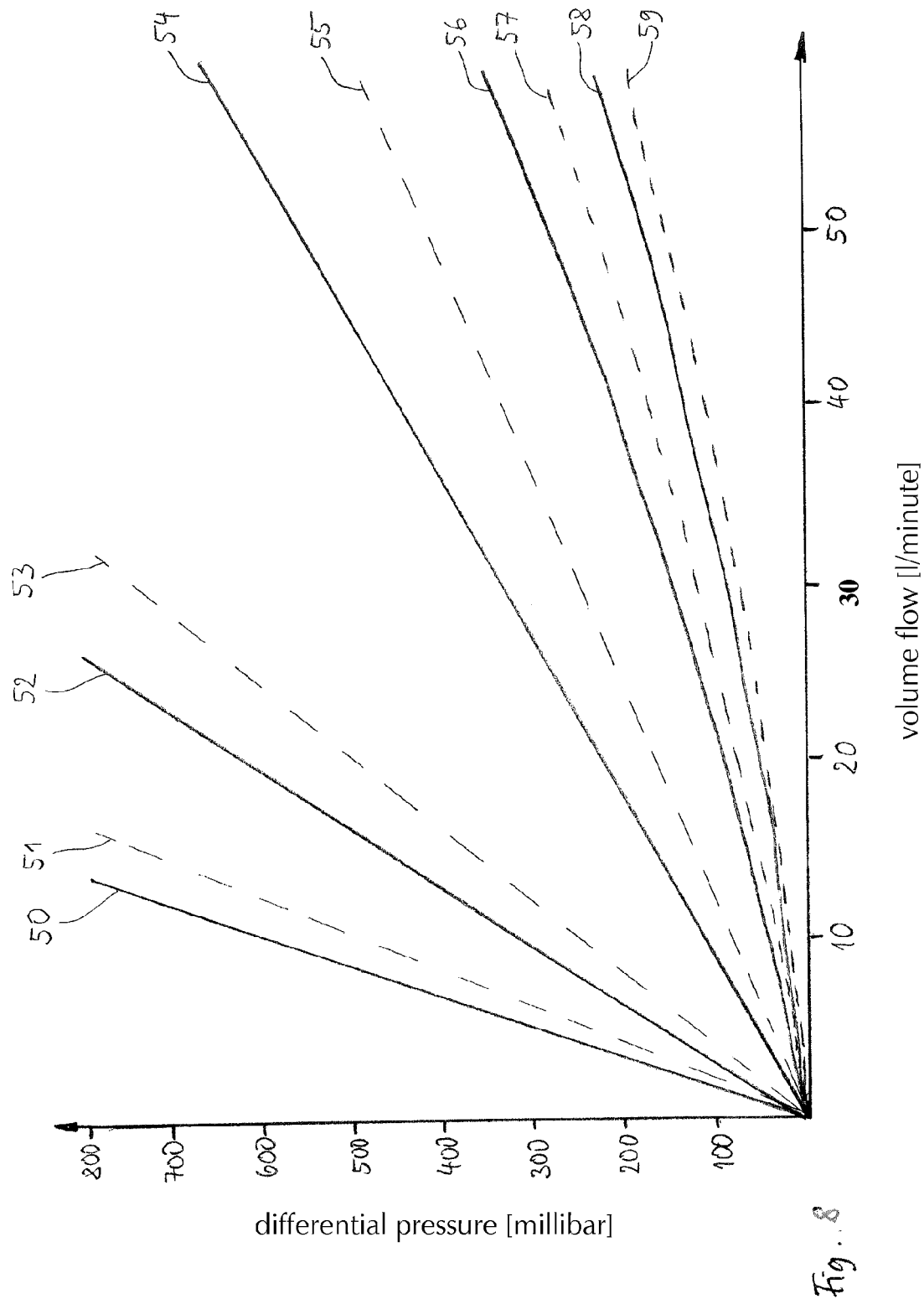
FIG. 8 shows a diagram in regard to the differential pressure as a function of the oil volume flow in the third embodiment of the suction oil filter device according to the invention.

By using the suction oil filter device according to the invention having the additional ultrafine filter medium, the differential pressure increases in the suction oil filter device. FIG. 8 contains curves which show the differential pressure as a function of the volume flow for a suction oil filter device in which only a fine filter medium is used (dashed lines), and for a suction oil filter device according to the invention, in which a fine filter medium and an ultrafine filter medium are used (solid lines). The curve 50 shows the curve in the suction oil filter device according to the invention at an oil temperature of −26° C., at which the oil has a high viscosity. The curve 51 shows, for the same temperature of −26° C., the curve for a suction oil filter device which only has a fine filter medium. At a volume flow of 14 l/minutes, for example, the differential pressure in a typical suction oil filter device is 630 millibar, the differential pressure reaching 800 millibar in the suction oil filter device according to the invention. Although the differential pressure in the suction oil filter device according to the invention has a higher absolute value at such low temperatures, the difference in the absolute level is still low, so that this circumstance may be accepted. The other curves 52 and 53 apply for an oil temperature of −18° C., the curves 54 and 55 for an oil temperature of −4° C., the curves 56 and 57 for an oil temperature of +10° C., and the curves 58 and 59 for +24° C. The absolute level of the differential pressure decreases with increasing oil temperature, as does the difference between the values which are measured in a suction oil filter device according to the invention and a suction oil filter device which only has a fine filter medium. At an oil temperature of +24° C., the differential pressure at a volume flow of 14 l/minute is only still approximately 25 millibar. The difference in the values between the two curves 58 and 59 is only still 2 millibar and is thus negligibly small. This illustrates that if the suction oil filter device according to the present invention is used at higher oil temperatures, there is only still an insignificantly high differential pressure.

Figure 9:
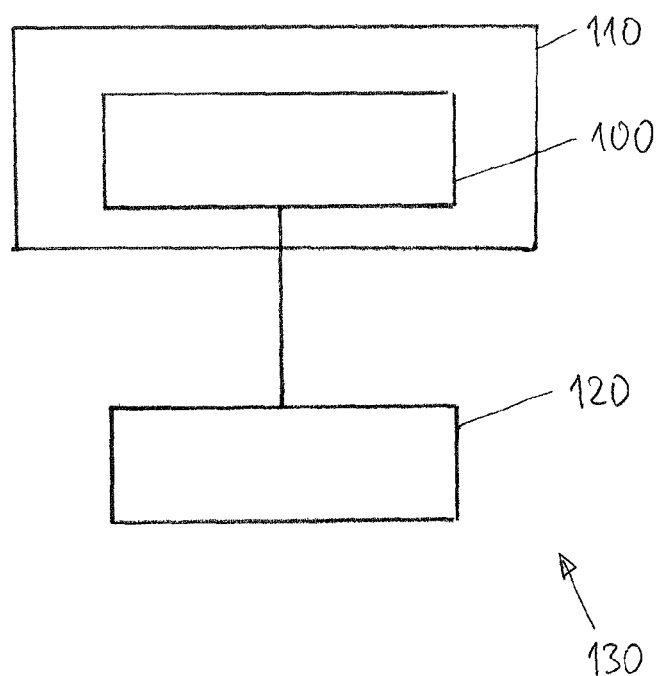
FIG. 9 shows a schematic illustration for the classification of the suction oil filter device according to the invention in a filter system.

In contrast, it is of greater significance that if the suction oil filter device according to the invention is used, the filtration performance increases and thus the service life of an additional pressure oil filter may be significantly increased. If an ultrafine filter medium having the same filter effect is used in a pressure oil filter device as in the associated suction oil filter device, a service life of the pressure oil filter device which is higher by 35% may be achieved. The maintenance outlay for a filter system 130, see FIG. 9, which has a pressure oil filter device 120 and suction oil filter device 100 in an oil pan 110 may thus be significantly reduced.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A filter apparatus comprising:
a housing having an inlet port and an outlet port;
an enclosed bag shaped filter media disposed inside the housing, having an inlet aperture on the bag shaped filter media to receive fluid into the bag via the inlet port; and
a patch filter media disposed around the inlet aperture overlying a surface of the bag shaped filter media extending radially outward from the inlet aperture.

2. A filter apparatus according to claim 1, wherein the patch filter media is disposed inside the bag shaped filter media.

3. A filter apparatus according to claim 1, wherein the patch filter media is a finer type filter media and the bag shaped filter media is relatively coarser than the flat patch filter media.

4. A filter apparatus according to claim 3, wherein the patch filter media separates particles having a size greater than 20 μm.

5. A fluid filter apparatus according to claim 1, wherein the patch filter media overlies at least a portion of the bag shaped filter media by laying directly upon the portion of the bag shaped filter media without a space therebetween.

6. The filter apparatus of claim 1, wherein the patch filter media is attached to the bag shaped filter media only near the inlet aperture.

7. The filter apparatus of claim 6, wherein the patch filter media is flexible and a portion of the patch filter spaced radially from the inlet aperture is free of the bag shaped filter media.

8. The filter apparatus of claim 7, wherein the patch filter media is pressed against by bag shaped filter media by pressure of the fluid.

9. A filter apparatus comprising:
a housing having an inlet port and an outlet port;
a non-flat first filter media disposed inside the housing; and
a second filter media disposed overlying a surface of the first filter media, wherein the second filter media overlies at least a portion of the first filter media adjacent either the inlet port or the outlet port by laying directly upon the portion of the non-flat filter media without a space therebetween, wherein the second filter media overlies a portion of the first filter media adjacent the inlet port and the first filter media is between the second filter media and the housing.

10. A filter apparatus according to claim 9, wherein the second filter media is attached to the first filter media adjacent the inlet port.

11. A filter apparatus according to claim 9, wherein the second filter media is a finer type filter media and the first filter media is relatively coarser than the second filter media.

12. A filter apparatus according to claim 11, wherein the second filter media separates particles having a size greater than 20 μm.

* * * * *